May 12, 1959

F. B. PORGES 2,886,349

MECHANICAL SEALS

Filed Nov. 6, 1957

Inventor
F. B. Porges
By Mason K Downing Seebold
Attys

United States Patent Office 2,886,349
Patented May 12, 1959

2,886,349

MECHANICAL SEALS

Frederick B. Porges, Carr Wood, Hale Barns, England, assignor to Flexibox Limited, Manchester, Lancashire, England, a British company Application November 6, 1957, Serial No. 694,840

Claims priority, application Great Britain November 9, 1956

2 Claims. (Cl. 286—8)

This invention relates to mechanical seals for revolving shafts and is concerned more particularly with such seals which are normally subjected to high temperatures, for example, where the shaft is the impeller shaft of a centrifugal pump dealing with hot boiler feed water. The seals to which this invention relates are of the type in which the rotary seal ring is spring loaded to press upon a fixed seal ring and has associated therewith a resilient gasket disposed between the interior of the rotary seal ring and a part of, or revolving with, the shaft.

The object of the present invention is to provide simple and efficient means to cool the mechanical seal and the resilient gasket hereinbefore referred to.

The invention consists in a mechanical seal for a pump or like revolving shaft, of the type referred to, in which a stationary sleeve secured to a fixed part of the pump or other unit extends parallel to but spaced from the shaft with a connection from said space within the sleeve and around the shaft to a space between the exterior of the sleeve and (1) a driven sleeve which carries the rotary seal ring and (2) the fixed seal ring, there being a branch connection supplying cooling liquid to the space around the exterior of the fixed sleeve for cooling the seal rings and the interior of the driven sleeve, said cooling liquid passing round the fixed sleeve to the interior of the latter and thence to an outlet branch on the aforesaid part secured to a fixed part of the pump or other unit.

Referring to the accompanying explanatory drawings.

Figure 1:
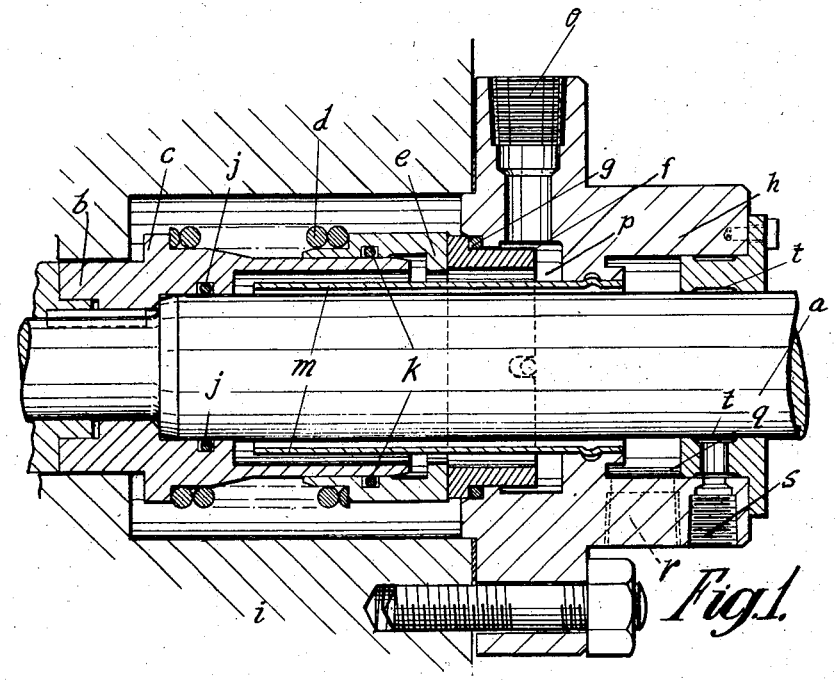
Figure 1 is a sectional elevation.
Figure 2:
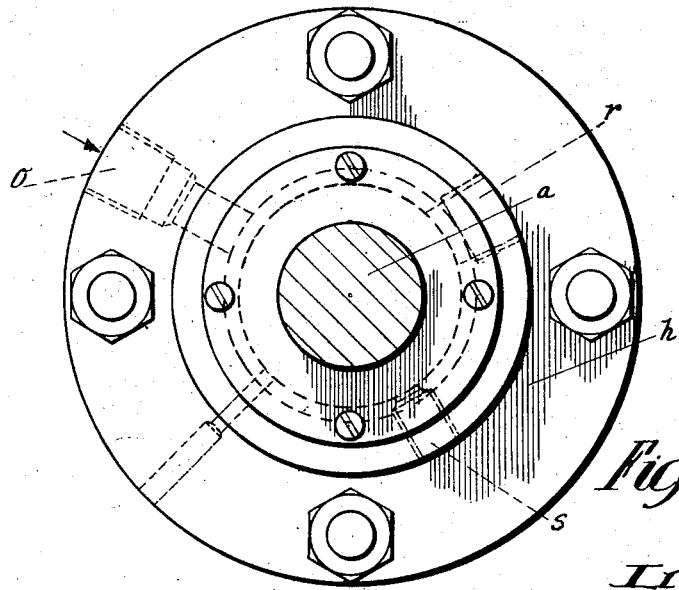
Figure 2 is an end view showing one application of the present invention to a pump or like shaft in which a mechanical seal prevents leakage along the shaft.

The pump or like shaft $a$ has keyed thereon a member $b$, provided with a collar $c$ against which abuts one end of a coil spring $d$, the other end of the spring abutting against a rotary seal ring $e$. The latter bears against a fixed seal ring $f$ which presses against a packing ring $g$ supported by a shoulder in a fixed member $h$ which is bolted to the pump or like casing $i$. The rotary and fixed seal rings $e$ and $f$ and the packing rings $j$, $k$ and $g$ prevent any escape of fluid from the pump casing in a known manner.

In accordance with the present invention, a stationary sleeve $m$ is secured at one end in the fixed member $h$ and extends concentric with but spaced from the shaft $a$ within both the fixed and rotary seal rings $f$ and $e$ and within and spaced from the driven sleeve $b$, which sleeve carries the rotary seal ring $e$. A packing $k$ makes a fluid tight joint between the inner surface of ring $e$ and the outer surface of member $b$. There is a branch connection at $o$ on the fixed member $h$ of the pump or other unit before referred to through which cooling liquid passes to the space $p$ between the outer side of the stationary sleeve $m$ and the stationary and rotary seal rings $e$ and $f$, and the driven sleeve $b$ and then passes along the inner side of the stationary sleeve $m$ to a space $q$ leading to a branch connection $r$ which may lead to waste.

With my improvement the cool liquid effects the desired cooling action while it travels along the outer surface of the sleeve $m$ and when it is heated in effecting such action, travels along the interior of the sleeve $m$ clear of the parts which have been cooled. The cooling liquid can, if desired, be under only slight pressure sufficient to effect the circulation. It does not mix with the liquid dealt with by the pump. $s$ is a leak-off connection from an annular space $t$ around the shaft $a$.

What I claim is:

1. A mechanical seal for making a fluid tight joint between a rotatable shaft and a stationary part of a pump or the like comprising, a sleeve keyed on said shaft, a packing between said sleeve and the shaft, a fixed seal ring around the shaft, a packing between said fixed seal ring and the stationary part, a rotary seal ring around the shaft, a coil spring engaging said sleeve and said rotary seal ring and pressing said rotary seal ring against the fixed seal ring, a stationary tubular member secured to a fixed part of the pump extending within said rings and sleeve concentrically to and spaced from the shaft and also spaced from the seal rings and the sleeve, a branch connection secured to a fixed part of the pump supplying cooling liquid to the space around the exterior of the tubular member for cooling the seal rings and the interior of the sleeve, an outlet branch on the fixed part of the pump, said cooling liquid passing around the tubular member to the interior thereof, around the shaft, and thence to the outlet branch.

2. A mechanical seal as set forth in claim 1, wherein the sleeve is provided with a collar against which one end of the coil spring is pressing, and a packing between the outer surface of said sleeve and the inner surface of the rotary ring.

References Cited in the file of this patent

UNITED STATES PATENTS 2,275,680   Myers _____ Mar. 10, 1942

OTHER REFERENCES

Flexibox Mechanical Seals, publication.